(12) United States Patent
Figotin et al.

(10) Patent No.: US 6,745,217 B2
(45) Date of Patent: Jun. 1, 2004

(54) RANDOM NUMBER GENERATOR BASED ON THE SPONTANEOUS ALPHA-DECAY

(75) Inventors: Aleksandr Figotin, Irvine, CA (US); Ilya Vitebskiy, Irvine, CA (US); Vadim Popovich, Fresh Meadows, NY (US); Gennady Stetsenko, Marrietta, GA (US); Stanislav Molchanov, Matthews, NC (US); Alexander Gordon, Weddington, NC (US); Joseph Quinn, Charlotte, NC (US); Nicholas Stavrakas, Charlotte, NC (US)

(73) Assignees: The Regents of the University of California, Oakland, CA (US); The University of North Carolina at Charlotte, Charlotte, NC (US); PDH International, Inc., Hallandale, FL (US)

( * ) Notice: Subject to any disclaimer, the term of this patent is extended or adjusted under 35 U.S.C. 154(b) by 0 days.

(21) Appl. No.: 10/127,221

(22) Filed: Apr. 22, 2002

(65) Prior Publication Data

US 2003/0018674 A1 Jan. 23, 2003

Related U.S. Application Data

(60) Provisional application No. 60/117,455, filed on Jan. 26, 1999, and provisional application No. 60/112,721, filed on Dec. 18, 1998.

(51) Int. Cl.[7] ................................................ G06F 1/02
(52) U.S. Cl. ..................................... 708/250; 708/255
(58) Field of Search ............................... 708/250, 251, 708/255

(56) References Cited

U.S. PATENT DOCUMENTS

5,696,828 A * 12/1997 Koopman, Jr. ............... 380/46
5,987,483 A * 11/1999 Edelkind et al. ............ 708/250

FOREIGN PATENT DOCUMENTS

JP 7162275 * 6/1995
WO WO 98/06175 * 2/1998

* cited by examiner

Primary Examiner—Chuong Dinh Ngo
(74) Attorney, Agent, or Firm—Daniel L. Dawes; Myers Dawes Andras & Sherman LLP

(57) ABSTRACT

The present invention is an apparatus and a method for generation of random numbers. The apparatus comprises an alpha-radiation source, such as Am 241, for which the decay product produces no secondary radiation with the energy equal or higher than that of the prime alpha radiation. The alpha particles emitted by the isotope and having reached the detector have a narrow energy spectrum and, hence, produce identical electrical pulses in a detector. An alpha-particle detection system is provided which includes a differential discriminator in combination with a logical selector. This combination of elements allows a positive identification of individual events of alpha-decay in the alpha-radiation source to be made and filters out any other signals produced by different radiation sources both inside and outside the apparatus. An electronic unit processes the stream of identical electric pulses into a stream of random numbers. The digital output of the physical random number generator will be completely free of correlations usually present in the output of other physical sources of random numbers and associated with: a) the physical source of randomness; b) the electronic circuitry; and c) outside and inside electromagnetic and other interference.

1 Claim, 2 Drawing Sheets

RANDOM NUMBER GENERATOR BASED ON THE SPONTANEOUS ALPHA-DECAY

RELATED APPLICATIONS

The present application is related to U.S. Provisional Patent Applications 60/112,721 filed on Dec. 18, 1998 and No. 60/117,455 filed on Jan. 26, 1999, and PCT/US99/29842 based thereon filed on Dec. 14, 1999 and claims priority therefrom under 35 USC 120, 363, and 365.

BACKGROUND OF THE INVENTION

1. Field of the Invention

The invention relates to the field of electronic instrumentation in which a random signal is produced or in particular a random number generator. The invention relates to the apparatus and methods for generation of random numbers or random signals.

2. Description of the Prior Art

Long sequences of random numbers are essential in mathematical statistics, data protection, communication security, mathematical simulation of natural phenomena and technological processes, etc. A random number generator (hereinafter, RNG) is at the heart of any information security technology where it is used for encoding key generation. For some applications the "quality of the random numbers" is absolutely crucial. For instance, if the random numbers used in the data protection applications are not "random enough", it will make the encryption code breakable and may pose serious information security problems, no matter how advanced and sophisticated the encoding procedure is.

Random numbers are produced by random number generators (RNG's), which for the most part are computer programs based on sophisticated mathematical algorithms. Most standard PC software packages include one or several such algorithmic RNG's. It is commonly recognized that any algorithmically generated digital sequence must develop apparent or hidden correlations and, hence, cannot be truly random. There are several standard random distributions, such as, Poisson, Bernoulli, etc., each of which can be converted to another. These standard distributions relate to truly random processes, meaning the absence of a statistical correlation between different events or numbers no matter how close or distant from one other they are. Such distributions correspond to the maximal output entropy. Thus, the quality of a random number generator is defined by the proximity of its output to one of the standard truly random distributions.

As long as the inevitable faultiness of algorithmically generated random sequences is not critical for an application, there is no need to look for something else. But there certainly exist a variety of important applications for which hidden long-range correlation in the RNG output is unacceptable. For instance, if the RNG is anything but perfect, the encryption code can be broken, and it does happen from time to time. In other words, the vulnerability of the encrypted information directly relates to the defectiveness of the RNG used. The only way to ensure the data protection, no matter how resourceful and well equipped the code-breakers are, is to use a perfect RNG for encoding key generation. In the case of RNG applications in mathematical statistics or computer simulation, the presence of a hidden correlation in the RNG output can and sometimes does make the results of statistical calculations unreliable or even worthless.

The only viable alternative to the inherently faulty algorithmic RNG's is a natural, or physical random number generator. A physical RNG is based on naturally occurring random phenomena, such as thermodynamic or quantum fluctuations, radioactive decay, etc.

Most of the existing physical RNG's are based on low energy random phenomena, particularly, thermal fluctuations (Johnson noise), or electronic quantum fluctuations in solids. All such devices have two major problems. Firstly, they inevitably display some autocorrelations and instability due to the physical nature of the underlying physical processes. Secondly, the low energy fluctuation can be affected by ubiquitous external and internal electromagnetic interference, the noise associated with the device electronic circuitry, acoustic noise, etc. These unwanted signals are never truly random and may well contribute to the deviation of the digital output of the physical RNG from the standard random distribution.

A radioactive decay is a natural process ideally suited as a source of randomness. The energy associated with a single event of spontaneous nuclear decay is by 5–7 orders of magnitude higher compared to other physical processes. Therefore, each and every event of a spontaneous radioactive decay does not depend on any external conditions, such as, the quantum state of atomic electrons, presence of other atoms or electromagnetic fields, ambient chemistry, temperature, etc. In this respect, spontaneous radioactive decay is unique. Several physical random number generators based on radioactive decay are known in the art. However, there is room for improvement.

Generally, the existing physical random number generators based on natural radioactive decay are superior compared to those based on low energy random phenomena. Still, there are several problems remaining.

The first one relates to the physical source of randomness itself. The standard Poisson time distribution of the events only applies to those ideal sources which display neither secondary radioactive decay, nor any kind of induced radiation which could be later mistaken for a primary radioactive decay. The induced radiation may include the X-ray quanta, the electrons knocked out of the atoms by the primary radiation, etc. If anything but the prime events is registered by the detector, then the digital output of RNG will inevitably display some autocorrelations. The reason is that different events, such as the primary and the secondary radioactive decays, or the primary events and the induced radiation, are related to one other and, hence, correlated in time. An additional complication may arise from the fact that the total number of unstable nuclei in a radioactive source gradually decreases in time and so does the mean radiation event frequency.

The second problem is associated with the signal registration method. For instance, if the energy of a single radioactive particle is first converted in electric or acoustic noise and only after that is digitized (as is shown in Mike Rosing and Patrick Emin, Ionization from Alpha Decay for Random Bit Generation. University of New Brunswick.), then one will face all the problems associated with physical RNG's based on low energy fluctuations.

One possible way to overcome the above problems is to utilize a directional randomness of a natural radioactive decay, rather than the temporal randomness. See Edelkind, et al., U.S. Pat. No. 5,987,483 (Nov. 16, 1999). The directional randomness implies that the direction of propagation of emitted radiation produced by individual events is a perfectly random characteristic of the process. However, utilization of the directional randomness requires a plurality of independent detectors surrounding a single source of radiation. Every detector should be supplied with independent electric circuitry. The mutual arrangement of the source and the plurality of detectors must exclude the possibility of detecting a single event of radioactive decay by more than one detector.

In present invention we propose the alternative solution that is thought to be less costly and much easier to implement. The proposed device requires a single detector of emitted radiation and utilizes the temporal randomness of spontaneous decay. At the same time the proposed device solves the problem of producing a standard, correlation free random sequence resistant to any kind of internal and external interference (electromagnetic, acoustic, etc.). Finally, consider a comparative analysis of spontaneous alpha decay versus beta and gamma decay. The whole variety of radioactive isotopes differs by the type of emitting particles.

Alpha decay produces helium nuclei. They have the largest mass and electric charge. Therefore, they get absorbed by the matter within a very short range. In the air alpha particles can travel just a few centimeters. Even a thin sheet of paper will totally absorb them. Typical energy of an alpha particle is around 5–6 MeV (compare to less than 1.5 MeV of the beta radiation and 0.5–1.5 MeV of the gamma radiation). The higher the particle energy is, the stronger signal it produces in the detector. More importantly, the energy of emitted alpha particles lies within a very narrow band. So, one can easily and reliably separate the signals produced by a particular type of alpha decay from any other sources of ionizing radiation, including high energy electrons, X-rays, as well as the alpha particles produced by radioactive isotopes different from those of the specified one. This latest feature is absolutely crucial for the creation of a flawless RNG. Indeed, as it was stated above, the clear separation of the signal produced by a particular radioactive event from all other sources of ionizing radiation is the necessary precondition for the device output to be a known standard random distribution. One of the most convenient and reliable sources of the alpha radiation is Am-241 (this isotope is widely used in household smoke detectors).

Beta decay emits electrons. Light-weighted beta particles can travel much longer distance through the medium, compared to the alpha radiation. They have substantially lower energy and therefore produce weaker electrical pulses in the detector. The main disadvantage of beta particles is that their energy is rather unpredictable and spread over the broad spectrum (they share specific energy of the decay with neutrinos). As a result, it is impossible to positively identify the signal produced by a beta particle emitted from the prime source of radiation and separate it from the background signals created by other kinds of ionizing radiation. Due to this background contribution, the temporal distribution of the registered events will inevitably deviate from the standard Poisson distribution p(n). That means that the digital output of the RNG device based on the beta decay will not be flawless.

Finally, the gamma decay radiates electromagnetic gamma quanta. The gamma radiation, having neither mass nor electrical charge, is highly penetrating. Although the spectrum of gamma quanta can be relatively narrow, their detection always imposes additional and substantial broadening of the spectrum that eventually creates the same problem as in the case with the beta particles. Besides, gamma particle absorption in the detector may occur in three different ways: photoelectric effect, Compton scattering, and creation of an electron—positron pair. Therefore, a single gamma quantum can produce several different signals. All this contributes to the complexity of the analogue output of the detector and makes it difficult to extract from it the standard random distribution. Finally, gamma radiation is not safe. Their use would require at least a 5 cm—thick lead shield around the scintillator.

The proposed natural RNG utilizing spontaneous nuclear decay of the alpha-type is designed to be free of the flaws which are unavoidable in all other known physical RNGs. Below, we will show how the utilization of spontaneous alpha decay allows separating the signals produced by the events of the primary radioactive decay from those of a different origin, and thereby obtain virtually perfect random digital output. Besides, the proposed device is portable, durable, and absolutely safe. In particular, it can be installed in virtually any standard PC.

BRIEF SUMMARY OF THE INVENTION

The invention is an apparatus for generation of random numbers comprising a source of alpha particles, and a detector of the alpha particles. The detector is disposed in a position relative to the source to detect the alpha particles coming from the source, and to generate a standard electric pulse in response to a detection of every single alpha particle. Necessary precautions should be taken to ensure that the energy spectrum of the alpha particles reached the detector is not substantially broadened compared to the original spectrum of the emitted alpha particles.

The detector comprises a detection device and an amplifier coupled to the detection device, and in particular comprises a silicon semiconductor detector and a detector bias supply circuit. The amplifier comprises a charge preamplifier and a linear amplifier coupled to the charge preamplifier.

A signal amplifier is followed by a selective discriminator to identify detection signals corresponding to an actual detection of the alpha particles emitted by the source. The transmission bandwidth of the discriminator must be broad enough to account for virtually all the alpha particles, reached the detector. At the same time the transmission bandwidth of the discriminator must be narrow enough to filter out improper pulses originated from the ionizing radiation other than the alpha particles coming from the source. A logic unit converts a sequence of the randomly distributed in time identical electrical pulses into a binary sequence.

The source of the alpha radiation has a half-life of one hundred years or more to ensure a stable performance of the device for at least several years. The decay products must be stable or, at least, must not produce nuclear radiation with the energy equal or higher than that of the original alpha decay. In the illustrated embodiment, the source is Am 241.

The selective discriminator comprises a differential discriminator to determine if the detected signal has an amplitude characteristic of the detection of the alpha particles originated from the source. The selective discriminator also comprises a logical selector to determine if the detection signal has a pulse shape characteristic of the detection of the alpha decay particles.

The simplest design of a binary generator is a clocked trigger circuit which toggles with each positively identified detection signal corresponding to an actual detection of the alpha decay particles from the source. The binary generator is alternatively a clocked time comparator circuit which measures successive time intervals between successive positively identified detection signals corresponding to actual detections of the alpha decay particles from the source and which assigns a binary value to the successive time intervals depending on comparative time lengths of the successive time intervals. The means by which detections are converted into binary signals can be varied widely to include any means now known or later devised, and it is to be expressly understood that the illustrated means are not to be read as limiting the nature of the binary generator. Any device capable of converting a randomly arriving sequence of nearly identical short pulses into a binary sequence can be employed with equal ease.

The apparatus further comprises a host device and an interface circuit coupled to the host device. The interface circuit is also coupled to the binary generator. The host device is a data system, which uses random numbers. The binary generator provides to the host device a signal that is represented by random binary numbers.

The invention is also defined as a method for generation of random numbers comprising the steps of producing alpha decay particles, detecting the alpha decay particles, generating a detection signal in response to detection of the alpha decay particles, identifying detection signals corresponding to an actual detection of the alpha decay particles from the source. And generating a binary signal in response to positive identification by the discriminator of the detection signals corresponding to an actual detection of the alpha decay particles from the source.

The invention having been briefly summarized, the invention may be better visualized by turning to the following drawings wherein like elements are referenced by like numerals.

The preferred embodiment of the invention now having been illustrated in the foregoing drawings. Consider the invention and its various embodiments as set forth in the following detailed description. The illustrated embodiment is set forth only for the purposes of illustration and should not be taken as limiting the generality of the claims, which may define an invention more broadly or narrowly than implied from the illustrated embodiment.

DETAILED DESCRIPTION OF THE PREFERRED EMBODIMENTS

The present invention is an apparatus and a method for generation of steady steam of random numbers. The apparatus comprises an alpha-radiation source, such as Am 241, for which the decay product produces no secondary radiation with the energy equal or higher than that of the prime alpha radiation. The alpha particles emitted by the isotope and having reached the detector have a narrow energy spectrum and, hence, produce identical electrical pulses in a detector. An alpha-particle detection system is provided which includes a differential discriminator in combination with a logical selector. This combination of elements allows a positive identification of individual events of alpha-decay in the alpha-radiation source to be made and filters out any other signals produced by different radiation sources both inside and outside the apparatus. An electronic unit processes the stream of identical electric pulses into a stream of random numbers. The digital output of the physical random number generator will be completely free of correlations usually present in the output of other physical sources of random numbers and associated with: a) the physical source of randomness; b) the electronic circuitry; and c) outside and inside electromagnetic and other interference.

Figure 1:
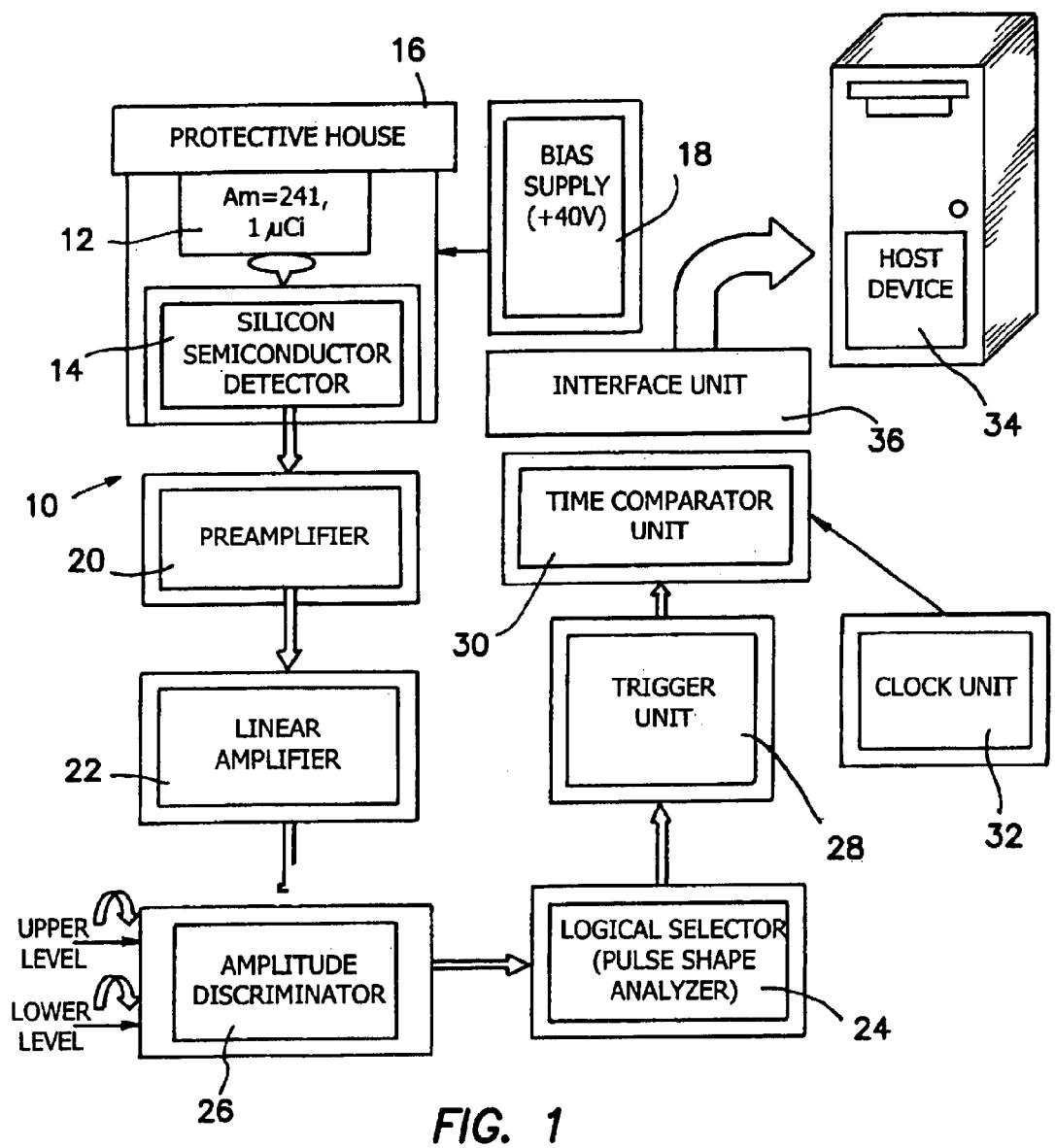
FIG. 1 is a simplified block diagram of a random number generator devised according to the invention.

Consider now the structure of an alpha-decay-based RNG. A block diagram of the α-decay-based RNG is shown in FIG. 1, generally denoted by reference numeral 10. An alpha-particle radioactive source 12 is provided. Depending on the source activity, the output range of source 12 may vary significantly. A source activity of 1 $\mu$Ci would provide the average initial output at least of 10,000 random bits per second. The general requirements of the isotope in the α-particle radioactive source 12 include:

a) reasonably long half-life, and b) a stable decay products or at least decay products that do not produce alpha radiation.

The key requirement of a narrow energy spectrum of the alpha-particles is met for all known alpha-isotopes, including, Am-241.

By way of example, Am-241 is a selection which satisfies these general requirements by having a half life of 432.7 years and no alpha-radiation decay byproducts or daughters producing alpha-radiation, but the invention is not limited to Am-241. Any other isotopic source satisfying the general requirements listed above may be substituted.

A silicon semiconductor detector 14 is used as the alpha-particle sensor. It may be a 300 $\mu$m thick planar ion-implanted silicon semiconductor with the active area of about 1 cm$^2$. Silicon semiconductor detector 14 is disposed relative to source 12 in a conventional manner to intercept the α-particles. The radioactive source 12 and the detector 14 are placed in the intimate proximity to each other within a protective housing 16. Protective housing 16 shields detector 14 from the light, other electromagnetic interference, and environmental alpha radiation. Protective housing 16 has a conventional structure and composition to provide the optical, electromagnetic and radiation shielding desired. A light-tight sheet metal or aluminum sheet housing is sufficient to provide the needed shielding. However, other nonmetallic materials incorporating conductive elements forming a conventional Faraday cage can be substituted if desired. Also, this housing might be combined with a material with a high magnetic permeability (Permalloy etc.). It would provide an additional shield against strong pulse magnetic fields.

A detector bias supply unit 18 is coupled through housing 16 to detector 14 and provides the proper detector voltage bias (the low noise, low current 40V power supply circuit can be used). A charge amplifier 20 and linear amplifier 22 is used to amplify and shape the very weak ionization current pulses, which are induced by the incident α-particles. The amplified pulses have an average amplitude of about 1 volt, a rise time of about 600 ns, and a fall time of about 1200 ns. Charge amplifier 20 and linear amplifier 22 are conventional and many other electronic devices and architectures could be substituted to provide the same or substantially identical amplification of the pulse signals of detector 14.

The output signal from linear amplifier 22 is provided to the inputs of differential discriminator 26 and logical selector 24. Differential discriminator 26 selects all signals which have the proper amplitude of the full alpha absorption peak. Differential discriminator 26 is a conventional voltage discriminator. Noise and other background signals are thus suppressed. Logical selector 24 analyses the shape of the pulses and discards the signals with a complicated or improper shape. The purpose of logical selector 24 is to block those signals whose shape does not match that which would be caused by an individual event of the alpha decay. Many different types of circuits are capable of performing the function of logical selector 24 and may be substituted one for the other. The most general approach is to utilize Digital Signal Processors (DSP) in which a conventional pattern matching algorithm has been stored and against which the output of discriminator 26 is compared. The pattern matching algorithm may select for statistically reliable matches with an empirically defined pattern corresponding to single alpha event decays in source 12.

The output of discriminator 26 is coupled as an input to selector 24. All the positively identified signals at the output of selector 24 are input to a trigger unit 28 and a time comparator unit 30. Each positively identified signal as determined by logical selector 24 inverts the state of a trigger unit 28, which in the illustrated embodiment is a D-flip-flop type trigger. The output of trigger 28 is read out during a specific time interval defined by a clock circuit or timing unit 32. The specific time interval is set to be much longer than the average duration of the positively identified signals or desired decay events. The two possible states of the output of trigger unit 28 correspond to the two possible value of the binary digits ("0" or "1"). The resulting binary sequence is a standard Bernoulli sequence. The above technique yields a relatively slow stream of random bits.

Figure 2:
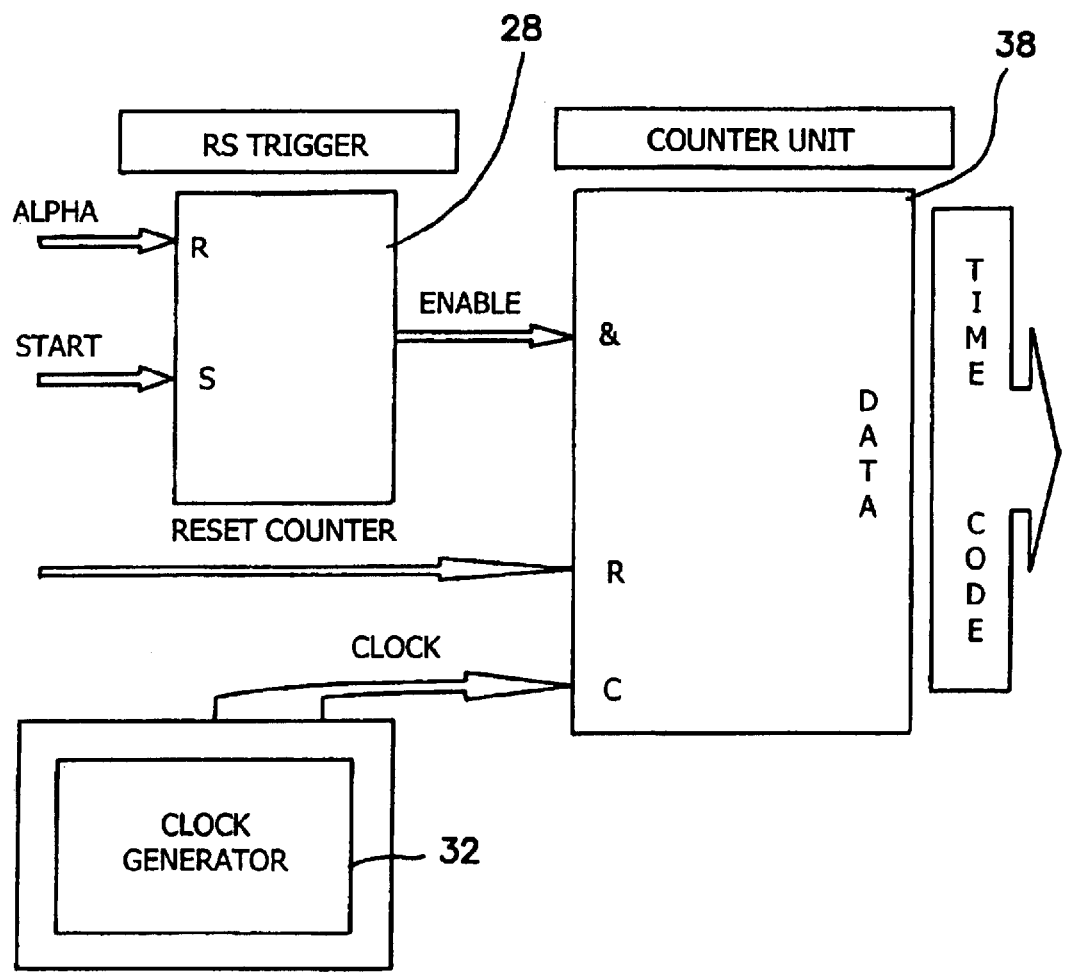
FIG. 2 is a simplified block diagram of the time comparator unit of FIG. 1.

For higher performance time a comparator unit 30 can be employed. Time comparator unit 30 compares the time intervals between the successive events. In the simplest case of two intervals, we can assign "0" or "1" depending on which of the two intervals is shorter. This approach yields one random bit for every pair of the successive events. In the illustrated embodiment time comparator unit 30 is a time counter circuit. As shown in FIG. 2 external signal START, generated by discrete logic circuitry (not shown) at the end of the last alpha event, sets RS trigger 28 to a predefined state (say, high). It generates an ENABLE signal which is coupled to counter unit 38 which allows the signal CLOCK to gradually increment counter unit 38 until a next alpha particle meets the acceptance criteria of logical selector 24. RS trigger 28 then disables further time incrementation, when ENABLE goes low, so that time interval code from counter 38 becomes available for the output and analysis. A control device or host computer 34 can compare consecutive time codes and assign "0" or "1" to the current random bit depending on the time code value of sequential time segments. For example, a "0" can be assigned a time code, if the preceding time code indicated a longer time interval, or vice versa. Counter unit 38 is then reset for the next count sequence by an external RESET COUNTER signal generated by discrete logic circuitry (not shown) with START.

The random bit stream produced by trigger unit 28 and/or time comparator unit 30 can be utilized by any host device 34 via a conventional interface unit 36. What the nature of host device 34 and interface unit 36 may be is specific for each application. Host device 34 is typically a microprocessor, a personal computer, a digital peripheral or other type of data system. Interface unit 36 is thus the circuit needed to convert and condition the signal output from trigger unit 28 or time comparator unit 30 to that required by host device 34.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for generation of random numbers comprising:

a narrow-band source of alpha decay particles;

a detector of said alpha decay particles, said detector disposed in a position relative to said source to detect all said alpha decay particles having reached the detector and generating an electric pulse in response to detection of said alpha decay particles a selective discriminator coupled to said detector to identify detection signals corresponding to an actual detection of said alpha decay particles from said source; and a binary generator coupled to said discriminator to generate a binary signal in response to positive identification by said discriminator of said detection signals corresponding to an actual detection of said alpha decay particles from said source, wherein said binary generator is a clocked time comparator circuit which measures successive time intervals between successive positively identified detection signals corresponding to actual detections of said alpha decay particles from said source and which assigns a binary value to said successive time intervals depending on comparative time lengths of said successive time intervals.

* * * * *